(12) United States Patent
White et al.

(10) Patent No.: US 6,685,380 B2
(45) Date of Patent: Feb. 3, 2004

(54) THREADED CLOSURE WITH CHAIN BINDER

(75) Inventors: Billy W. White, Spring, TX (US); Blake E. Smith, College Station, TX (US)

(73) Assignee: Robbins & Myers Energy Systems, L.P., Houston, TX (US)

(*) Notice: Subject to any disclaimer, the term of this patent is extended or adjusted under 35 U.S.C. 154(b) by 62 days.

(21) Appl. No.: 10/021,175

(22) Filed: Oct. 30, 2001

(65) Prior Publication Data

US 2003/0081992 A1 May 1, 2003

(51) Int. Cl.$^7$ .............................. B65D 43/26; B67B 7/18
(52) U.S. Cl. .............................. 403/322.4; 292/256.69; 220/284; 24/273
(58) Field of Search ............................ 403/321, 322.1, 403/322.3, 322.4, 323, 324, 325; 27/269, 270, 273; 292/256.5, 256.6, 256.65, 256.67, 256.69, 256.73, 256.75, DIG. 11; 74/37, 89.2, 89.21, 89.22; 220/284, 286, 288, 315; 254/1, 213, 221, 224, 243, 251, 387; 114/117

(56) References Cited

U.S. PATENT DOCUMENTS

| 139,969 | A | * | 6/1873 | Paff .............................. 24/273 |
| 691,658 | A | * | 1/1902 | Newman .................... 24/273 X |
| 946,555 | A | * | 1/1910 | Muehlhausen et al. |
| 2,026,461 | A | * | 12/1935 | Combs |
| 2,121,881 | A | * | 6/1938 | Newton .................. 292/256.67 |
| 2,279,666 | A | * | 4/1942 | Etnyre |
| 2,309,769 | A | * | 2/1943 | Hubbard .................... 24/279 X |
| 2,375,685 | A | * | 5/1945 | Pennington ............... 24/273 X |
| 3,057,438 | A | * | 10/1962 | Wanner et al. |
| 4,237,936 | A | * | 12/1980 | Lollis et al. |
| 4,423,992 | A | * | 1/1984 | Ankeny |
| 4,515,287 | A | * | 5/1985 | Baudoux et al. |
| 5,173,998 | A | * | 12/1992 | Mackenzie .................... 24/273 |
| 5,246,068 | A | * | 9/1993 | Besson |
| 6,007,120 | A | * | 12/1999 | Vogt et al. .......... 292/256.65 X |
| 6,454,117 | B1 | * | 9/2002 | Pysher et al. ....... 292/256.73 X |
| 2002/0170599 | A1 | * | 11/2002 | Disher et al. |

OTHER PUBLICATIONS

U.S. patent application Ser. No. 10/017,966, Smith et al., filed Oct. 30, 2001, pending.

* cited by examiner

Primary Examiner—Gregory J. Binda
Assistant Examiner—Ryan M. Flandro
(74) Attorney, Agent, or Firm—Browning Bushman, P.C.

(57) ABSTRACT

Closure 10 includes a closure hub 12 for receiving a closure cap 30. A vessel end of the hub may be welded to a pressurized vessel or pipeline. A pulling device 20 may include a pivot member 26, a pulling lever 27, a pulling connector 28, and a flexible member 46. A pulling lever is connected by a connector pivot 23 to the pivot member, and the pulling connector is connected at a lever pivot 29 to the pulling lever. In the method of the invention, the pulling lever is pulled toward an anchor to thread or unthread the cap from the hub.

16 Claims, 4 Drawing Sheets

THREADED CLOSURE WITH CHAIN BINDER

FIELD OF THE INVENTION

The present invention relates to vessel or pipeline closures, which selectively enclose and seal an interior portion of a pressure containing vessel or pipeline. More particularly, the methods and systems of this invention relate to closures of the type used on pipeline pig launching and receiving systems, and closures used as access portals for pressurized vessels. The methods and system of this invention may improve safety, closure life expectancy, and functional operation.

BACKGROUND OF THE INVENTION

A closure allows convenient and routine access to the interior of a pressure vessel or other volumetric device. A threaded pipeline closure, for example, consists primarily of a hub added to a pipeline inlet and a removable door that seals pressure within the pipeline. A pipeline "pig" is a device which is commonly placed into a pipeline using a threaded closure. Pipelines are commonly cleaned and inspected by launching a pig into the pipeline and recovering it, sometimes along with accumulated debris, at a receiving point. Closures may thus be used to cap an end of both a pig launcher and a pig receiver.

Closures may be included on other volumetric pressure vessels, such as storage tanks. Such vessels may contain fluid at high pressures ranging from full vacuum to above 3700 psig. Closures of this type typically range in nominal pipe size from 2 to over 60 inches, corresponding with the nominal size of the vessel port or entrance to which they attach. Closures are conventionally made of metallic materials, and are often formed in a closed die forging process.

The two main components of a closure are a hub and a cap. The hub may be secured at one end to the pipeline or other vessel by welding or with threads. The opposite end of the hub may have external/male threads to mate with internal/female threads on the cap. The cap may engage the hub to create a seal. An O-ring or other member is conventionally included on either the hub or the cap to seal the contents of the pipeline or other vessel. Heavier closures may have a hinge or other support member, such as a pivoting swing-arm, to retain the cap in the vicinity of the hub and make it easier to manipulate after being disengaged from the hub.

Prior art closures commonly include external "hammer lugs" or "wings" on the exterior of the cap, allowing the cap to be tightened or loosened with a hammer. In some cases, the hammer used can be quite large and heavy. Although caps are often constructed of resilient steel or other material, repeated hammer blows may permanently deform the lugs. With continued use, the lugs may fold back or "cauliflower," progressively cold-working and embrittling the material.

Several hazards may result from this hammering process. First, metal fragments may fly from the cap as it is struck. The fragments, traveling at high speeds, can create a health and safety hazard. To reduce this hazard, continuous maintenance may be necessary to remove any sharp edges on the cap. Second, sparks may be generated when the cap is struck. Under certain conditions, such as when operating near flammable materials, sparks may be unacceptable. In these instances, special hammers made of brass, rubber, or other materials may be required. Third, repeated hammering can cause stress cracks or other defects in the cap material. These defects reduce the reliability of the closure and create the possibility of leaking and catastrophic release of pressurized fluids contained in the vessel. Hammers may also be difficult to use in confined areas. Cold climates may exacerbate these problems by making the materials more brittle.

There are also practical problems with lug-type closures. First, they require a hammer or other tools to operate. The hammer may be misplaced, or the proper size tool may not be available when needed. A large hammer can be awkward, such as when multiple closures are being serviced, especially in a confined space. If not tightened properly, the chance is greater the cap will loosen and leak, particularly when exposed to vibrations or physical shocks. Alternatively, a lug-type closure may be over tightened because it is impossible to precisely modulate the force with which the lug is struck with the hammer. If the proper size hammer is not available, there is an increased chance of improper tightening. As discussed above, the hammering process impacts wear and tear to the closure, shortening the life of the device. The above are examples of some of the shortcomings associated with the prior art.

The present invention overcomes the disadvantage of the prior art. An improved closure is provided, eliminating the need to tighten and loosen the closure using a hammer.

SUMMARY OF THE INVENTION

This invention provides methods and systems for threading and unthreading a closure to the hub of a pipeline or vessel. The claim is relatively simply to operate, reliable, and cost effective. The closure of this invention eliminates the need for hammering on lugs to tighten or loosen the closure. The closure is tightened or loosened by applying a substantially tangential force to a radially outward portion of the cap.

In one embodiment, the system includes a pulling device which selectively applies either a tightening or loosening force, through a flexible member such as a chain, to thread or unthread the cap.

It is an object of this invention to provide a user-friendly and reliable closure requiring minimum maintenance. The optionally lug-free closure may eliminate the need for lug hammering and its detrimental effects.

It is a related object of this invention to provide an improved closure. The described methods and systems for tightening and loosening a closure are more safe, reliable, and more effective than those provided by existing methods and systems.

It is a feature of this invention that the opening and closing mechanism may be safer by virtue of its ability to prevent the closure from leaking or failing unexpectedly, such as may otherwise occur when a closure with hammer lugs is exposed to vibrations or thermal changes.

Another feature of this invention is to provide a closure which is relatively simple to operate and need not require any additional tools to operate.

Yet another feature is that, by eliminating the need for hammering, the corresponding sparks and/or flying particles associated with hammering may also be eliminated, so that the closure may be used in combustible environments, or at other locations in which sparks and flying particles may be hazardous. The closing system may be locked in place, preventing accidental opening of the closure through vibration, shock, or thermal changes.

A further feature of the invention is that, in the case of a stuck cap, the device may be positioned with slack in the chain or other flexible member, and the operator may "pop" or "bump" the handle to effectively render blows to the cap without the impact damage that may be caused by a hammer.

It is an advantage of this invention that, by eliminating the need for hammering, the corresponding work-hardening, stress cracks, plastic deformation, and other detrimental effects may also be significantly reduced or eliminated. A related advantage is that maintenance associated with hammer lugs may be eliminated.

It is also an advantage of the invention that the closure cap may be supported externally after removal from the hub.

Yet another advantage of this invention is that some of its components, such as the pulling device and flexible member, may include relatively inexpensive, readily-available, off-the-shelf components. A related advantage is that the closure may not be substantially more expensive than other closures. Existing closures may also be altered or retrofitted to incorporate this invention.

These and further objects, features, and advantages of the present invention will become apparent from the following detailed description, wherein reference is made to the figures in the accompanying figures and drawings.

DETAILED DESCRIPTION OF THE PREFERRED EMBODIMENTS

Figure 1:
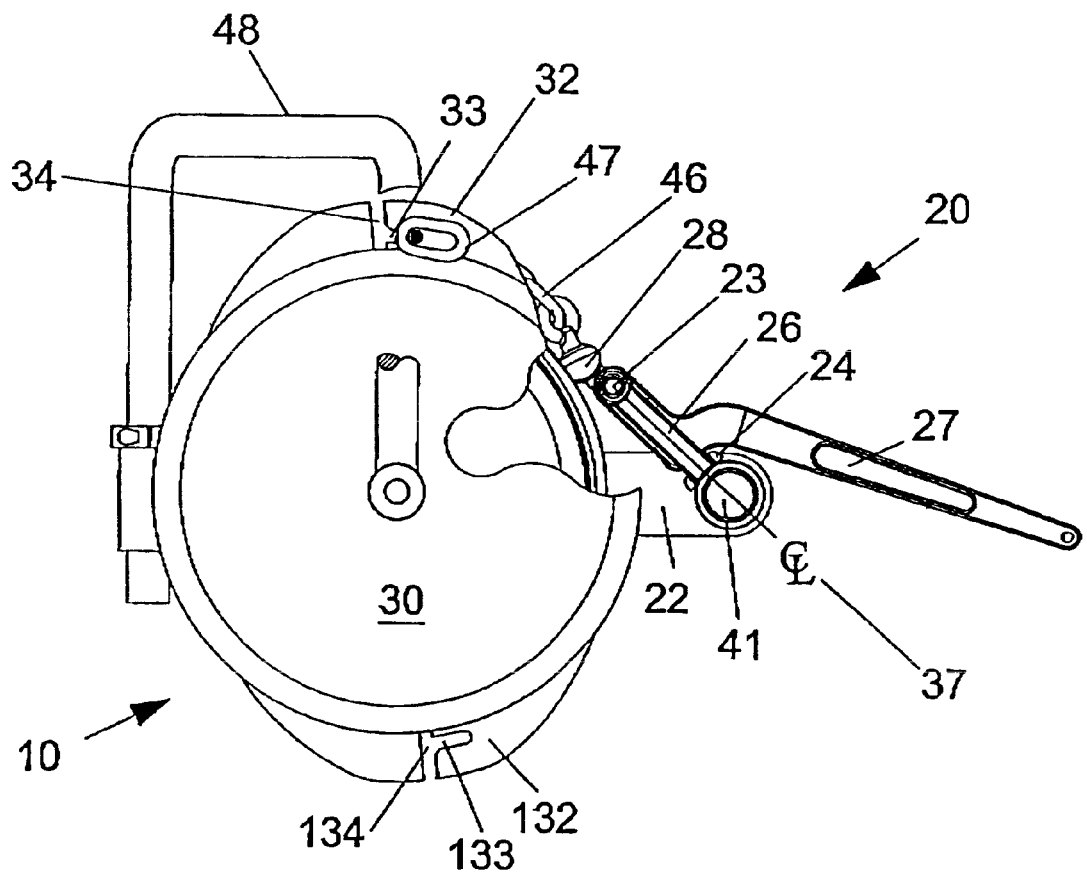
FIG. 1 is a top end view of a closure according to the present invention, with the lever of the leveraged pulling device in a locked position.

FIG. 1 illustrates components that may be included with a closure 10 according to the present invention. The closure may be used for sealing closed an opening or port in a vessel. The term "vessel" as used herein may be defined broadly to encompass closures for pipelines, tanks, containers, or other volumetric enclosures in which a pressure internal to the vessel may be different from a pressure external to the vessel. Such volumetric enclosures may include containment vessels in which a fluid is conducted, contained, and/or processed. A closure may be manufactured substantially from metallic components.

A tightening or loosening force may be applied to the closure cap 30 through a leveraged pulling device 20 including components that interact to apply a pulling force substantially tangential to a periphery of a closure cap 30, thereby causing the cap 30 to rotate relative to the vessel for tightening or loosening the cap 30.

Figure 2:
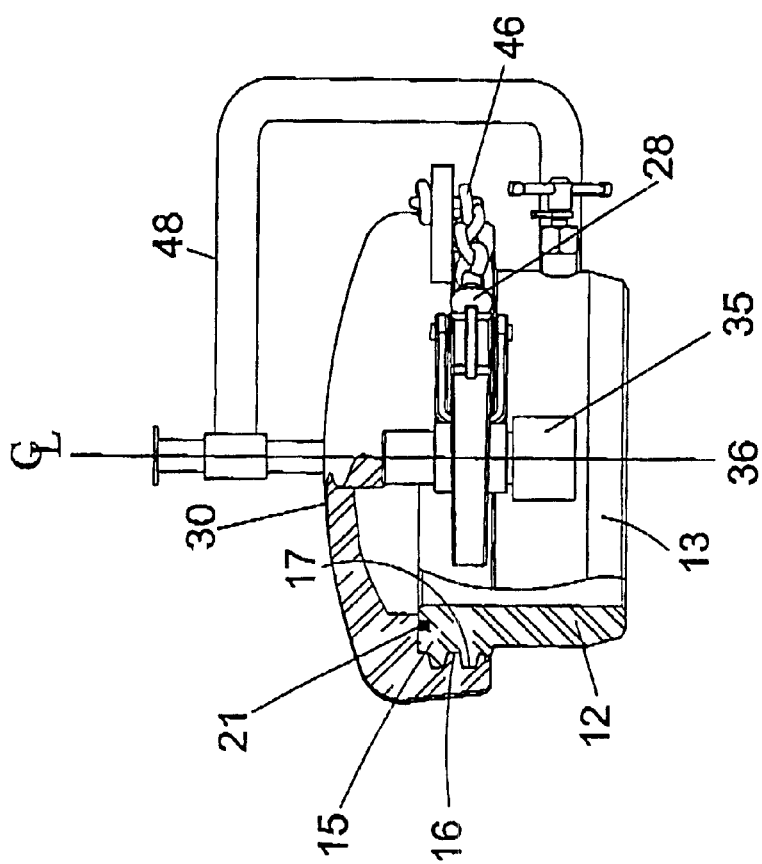
FIG. 2 is a side view in partial cross-section of the closure illustrated in FIG. 1.

A closure hub 12 as shown in FIG. 2 may be provided to engage the closure cap 30 to secure the cap over the port. A vessel end of the hub 12 may be fixedly and sealingly secured to the vessel, e.g. by welding or threading. The hub includes a through bore 13, and provides a cap end 15 opposite the vessel end, with the cap end including cap engagement threads 16. The hub through bore 13 may have an ID at least as large as an ID of the port to the pressure vessel (see FIG. 2).

A cap 30 may include a hub engagement thread 17 for threaded engagement with the hub 12. The cap engagement thread 16 and the hub engagement thread 17 each may be a modified ACME thread. The threads 16, 17 provide for rotation of the cap 30 relative to the hub 12, with sealing engagement provided by an O-ring 21. The threads may be configured such that the cap may be tightened beyond being substantially "hand tight" or relatively free turning, to sealingly engage the cap 30 with the hub 12. Final rotation of the cap 30 may be accomplished by a leveraged pulling device 20 discussed below. Conversely, the cap 30 may be initially loosened from the hub 12 with a partial rotation of the cap 30 applied by a leveraged pulling device 20.

A set of one or more pulling stops 32, 132 may be incorporated with the cap 30. A first pulling stop 32 may be for tightening the cap 30 relative to the hub 12, and a second pulling stop 132 may be on an opposing side of the cap 30 from the anchor 22.

Figure 3:
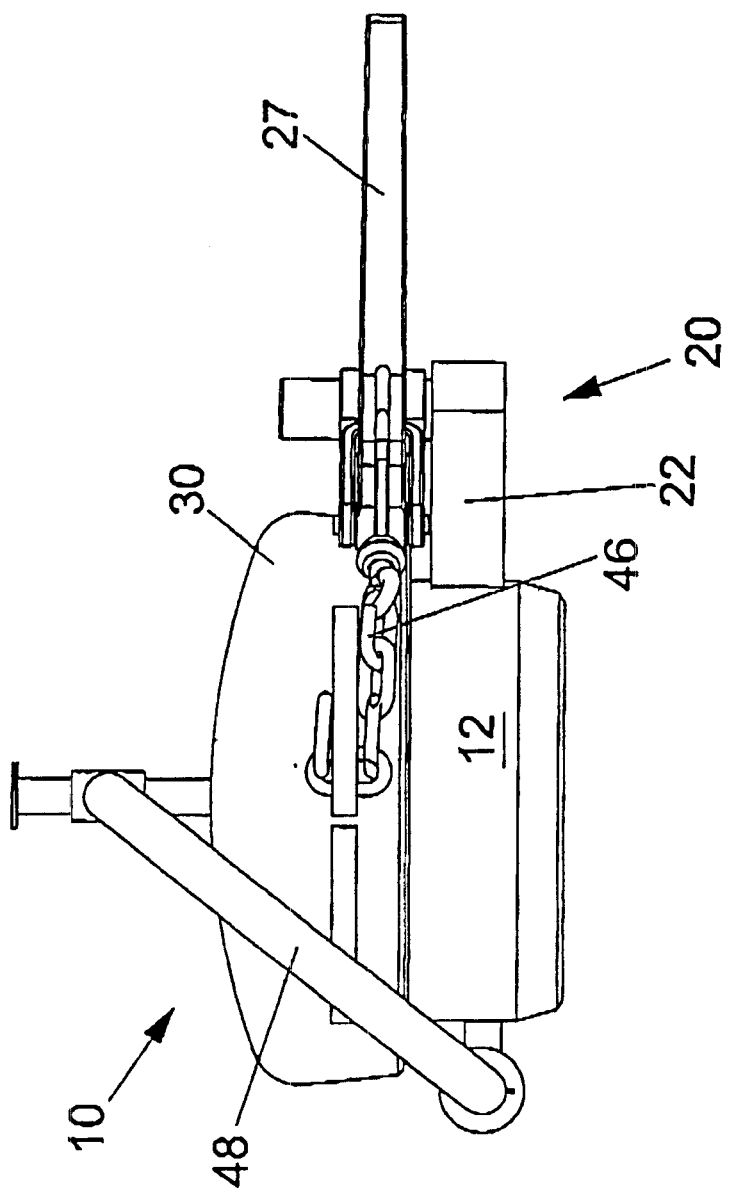
FIG. 3 is a side view with the closure with the pivot member rotated approximately 90 degrees from the side view of FIG. 2.

In a preferred embodiment, as illustrated in FIGS. 1, 2, and 3, an anchor 22 may be fixedly secured to the hub 12, or to any stationary object such as a vessel body which does not rotate with respect to the cap 30. The anchor 22 may support the reaction force in response to the rotational force applied to the cap 30. The anchor 22 may provide a pivot mount 41, such as a pin, hole, or profile to pivotally support the pivot member 26 of the leveraged pulling device 20 discussed below.

Figure 4:
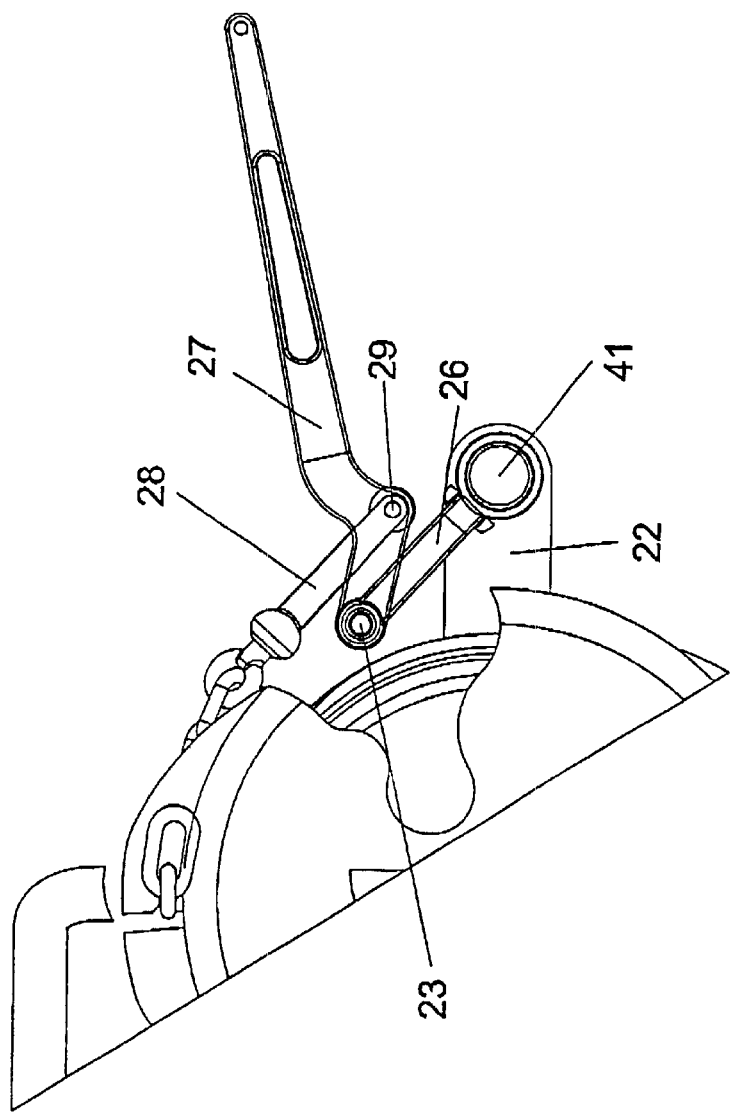
FIG. 4 is a top end view of a portion of the closure illustrated in FIG. 1, with the lever of the leveraged pulling device positioned for exerting a tightening force on the cap.

The leveraged pulling device 20 may include a pivot member 26, a pulling lever 27, and a pulling connector 28. The pivot member 26 may be connected at one end to the mount 41. The pulling lever 27 is connected to the pivot member 26 at a connector pivot 23. The pulling connector 28 is pivotally mounted to the pulling lever 27 at lever pivot 29, as shown in FIG. 4. The leveraged pulling device 20 may be similar to a commercially available over-center locking tool commonly known as a "chain binder" or "boomer" used with chains to secure cargo to the bed of a flat-bed truck.

Flexible member 46 includes one end secured to the pulling connector 28 of the leveraged pulling device 20. The flexible member 46 may have multiple stop engagement members 47, which selectively engage one of the pulling stops 32, 132 located on the periphery of the cap 30. The flexible member 46 may be a close-link chain, with individual links each substantially oval-shaped, and with adjacent links connected substantially perpendicular to each other. A selected pulling stop 32, 132 may include tangential slots 33, 133 and/or radial slots 34, 134, which are each slightly wider than the thickness of a chain link, to allow a link to be positioned within a slot. An adjacent link may then serve as the stop engagement member 47, because the adjacent link's substantially perpendicular orientation would prevent it from passing through the relatively narrow slot.

In one embodiment, the pivot member 26 may be pivotally mounted to the anchor 22 at the pivot mount 41, using a threaded connector 24. The leveraged pulling device 20 may be selectively rotated at the pivot mount 41 to direct the attached flexible member 46 toward the tightening stop 32 or loosening stop 132, to tighten or loosen the cap 30. The pivot member 26 may be removably mounted to the anchor 22 with a fastener 35, as shown in FIG. 2. The fastener 35, which may be a threaded nut but alternatively could be a manually operated snap-ring or wing nut, may then be removed to reposition the leveraged pulling device 20 from one to another of the tightening position and the loosening position. In another embodiment, a tightening pivot member and a loosening pivot member may each be rotatably fixed to the anchor 22.

The leveraged pulling device 20 may have a locking feature such that with the pulling lever 27 in a locked position (FIG. 1), the connector pivot 23, the lever pivot 29, and the mount 41 align in a common plane which may be substantially parallel to an axis of the hub. The leveraged pulling device 20 may also include a more reliable locking position, whereby the pulling lever is further moved toward the closure 10, such that the lever pivot 29 is spaced inward with respect to the hub and cap centerline 36, from a line extending between the centerline of the connector pivot 23 and the pivot mount 41. The resulting force on the pulling lever 27 by the pulling connector 28 at the lever pivot 29 forces the pulling lever 27 inward to a resting position against the anchor 22.

A support member 48 may be included to support the cap 30 when fully disengaged from the hub 12. The support member 48 may consist of a hinged swingarm to retain the cap near the closure and to assist in its handling.

In the preferred embodiment, the pulling stops 32, 132 may include substantially tangential slots 33, 133 formed into the periphery of the cap 30. In this embodiment, the pulling stops 32, 132 may also include a radial slot portion 34, 134. If the flexible member 46 is a chain as described above, a chain link may be positioned within one of the pulling stops 32, 132 by sliding the chain link through one of the radial slots 34, 134 and into the one of the tangential slots 33, 133. The adjacent link would then serve as the stop engagement member 47 as described above.

In another embodiment, the cap 30 may include one or more additional tightening stops 32 and one or more additional pulling stops 132 to allow the operator to choose which stop 32 or 132 is best situated for engagement with the stop engagement member 47. Referring to FIG. 1, rather than provide a tightening stop at the 10:00 position and a loosening stop at the 4:00 position, two tightening stops could be provided at the 10:00 and 7:00 positions, and two loosening stops could be provided at the 2:00 and 5:00 positions. The chain 46 may thus be repositioned on a selected stop when tightening or loosening a used or worn enclosure. In yet another embodiment, the cap may include a plurality of stops 32, 132 equally spaced along the entire 360 degree periphery of the cap 30. In this embodiment, a given stop could serve as either a tightening stop 32 or a loosening stop 132, depending on its variable position relative to the anchor 22.

Alternate embodiments of closures according to this invention may include variations of arrangements of cap engagement threads 16 and hub engagement threads 17. For example, one closure configuration may provide for cap initial engagement with the hub and rotation to sealing cap engagement with hub, wherein the cap is rotated relative to the hub for less than five 360 degree rotations, depending at least partially on closure pressure rating and size. In other embodiments, the cap may require less than one rotation for cap sealing engagement.

Other embodiments may dispense with multiple revolution threads on the cap and the hub, and instead provide a plurality of interlocking lugs or "short-threads" on each of the cap and hub, for rotational engagement of a cap and hub. In such embodiments, the cap may be rotated from initial engagement to full sealing engagement with the hub in less than one revolution, and possibly even less than one-quarter turn. Such embodiments may typically include two, three, or four sets of short-thread type interlocking lugs. Still other embodiments may include additional short-thread interlocking lugs.

In the preferred embodiments discussed above, the cap may include substantially female or internal threads 17, and the hub may include substantially male or external threads 16. However, in still other embodiments of closures according to this invention, the cap may include substantially male threads, and the hub may include substantially female threads. In the latter embodiments, the cap may essentially be a plug, and the hub a receptacle for the cap within a portion of the hub. In such embodiments, one component, either the cap or the hub, may include an anchor attached thereto, and the other component of the cap and hub may include one or more tightening or pulling stops attached thereto. A pulling assembly may be engaged thereto and between each of the anchor and the stops.

It may be appreciated that changes to the details of the illustrated embodiments and systems disclosed are possible without departing from the spirit of the invention. While preferred and alternative embodiments of the present invention have been described and illustrated in detail, it is apparent that further modifications and adaptations of the preferred and alternative embodiments may occur to those skilled in the art. However, it is to be expressly understood that such modifications and adaptations are within the spirit and scope of the present invention, set forth in the following claims.

What is claimed is:

1. A closure to sealingly enclose a port in a vessel, comprising:
   a hub having a vessel end fixedly and sealingly secured to the vessel, a through bore, a cap end opposite the vessel end, and a cap engagement thread on the cap end;
   a cap including a hub engagement thread for threaded engagement with the cap engagement thread;
   one or more pulling stops positioned along a periphery of the cap; an anchor fixed with respect to the hub;
   a leveraged pulling device including a pivot member secured to the anchor, a pulling lever pivotally connected by a connector pivot to an extending from the pivot member, a pulling connector pivotally connected to the pulling lever at a lever pivot, and a pivot mount pivotally connecting the pivot member to the anchor, the leveraged pulling device positioning the lever pivot adjacent a pulling device plane parallel to a central axis of the hub and extending between an axis of the connector pivot and an axis of the pivot mount, such that the pulling lever may be moved toward the hub into a locking position;
   a flexible member secured at one end to the pulling connector of the leveraged pulling device;
   one or more stop engagement members along the length of the flexible member to selectively engage a selected one of the one or more pulling stops on the cap, such that applying the force to the lever of the leveraged pulling device may selectively thread and unthread the cap from the hub.

2. The closure as defined in claim 1, wherein the leveraged pulling device is rotatably secured to the anchor, such that the leveraged pulling device may be selectively rotated between a cap tightening position and a cap loosening position.

3. The closure as defined in claim 1, wherein the pulling lever of the leveraged pulling device comprises:
   a substantially straight, elongate end portion for receiving a rigid tube to increase leverage of the leveraged pulling device.

4. The closure as defined in claim 1, wherein the one or more stops on the cap are each a slot extending to the periphery of the cap.

5. The closure as defined in claim 4, wherein each slot includes a slot portion substantially tangential to the periphery of the cap.

6. The closure as defined in claim 4, wherein each slot is positioned within a flange fixed to the periphery of the cap.

7. The closure as defined in claim 1, wherein the flexible member comprises a close-link chain, such that the one or more stop engagement members comprise individual links of the close-link chain.

8. The closure as defined in claim 1, wherein the one or more pulling stops comprises:
   at least one tightening slot and at least one loosening slot substantially radially opposite the at least one tightening slot, such that the flexible member engages the at least one tightening slot when tightening the cap, and the flexible engages the at least one loosening slot when loosening the cap.

9. The closure as defined in claim 1, further comprising:
   a pivot mechanism for supporting the cap from the hub when the cap is removed from the hub.

10. A closure to sealingly enclose a port in a vessel, comprising:
    a hub having a vessel end fixedly and sealingly secure to the vessel, a through bore, a cap end opposite the vessel end, and a cap engagement thread on the cap end;
    a cap including a hub engagement thread for threaded engagement with the cap engagement thread;
    a tightening slot and a loosening slot substantially radially opposite at least one tightening slot, a pivot mount pivotally connecting the pivot member to the anchor, the leveraged pulling device positioning the lever pivot adjacent a pulling device plane parallel to a central axis of the hub and extending between an axis of the connector pivot and an axis of the pivot mount, such that the pulling lever may be moved toward the hub into a locking position, such that a flexible member engages the at least one tightening slot when tightening the cap, and the flexible member engages the at least one loosening slot when loosening the cap;
    an anchor fixed with respect to the hub;
    at leveraged pulling device secured to the anchor;
    the leveraged pulling device including a pivot member rotatably secured to the anchor at a pivot mount, such that the leveraged pulling device may be selectively rotated between a cap tightening position and a cap loosening position, a pulling lever pivotally connected by a connector pivot to and extending from the pivot member, and a pulling a pulling connector pivotally connected to the pulling lever pivot;
    a flexible member secured at one end to the pulling connector of the leveraged pulling device;
    one or more stop engagement members along the length of the flexible member to selectively engage a selected one of the tightening slot and loosening slot, such that applying the force to the lever of the leveraged pulling device may selectively thread and unthread the cap from the hub.

11. The closure as defined in claim 10, wherein each of the tightening slot and loosening slot extends to the periphery of the cap.

12. The closure as defined in claim 10, wherein the flexible member comprises a close-link chain, such that the one or more stop engagement members comprise individual links of the close-link chain.

13. The closure as defined in claim 10, further comprising:
    a pivot mechanism for supporting the cap from the hub when the cap is removed from the hub.

14. A method of sealingly enclosing a port in a vessel, comprising:
    fixedly securing a vessel end of a hub to a vessel, the hub having a through bore, a cap end opposing the vessel, and a cap engagement thread on the cap end;
    providing a cap for threaded engagement with the cap end of the hub;
    fixedly securing an anchor to the hub;
    fixedly securing each of a one or more pulling stops along a periphery of the cap;
    securing a pivot member of a leveraged pulling device to the anchor, pivotally connecting a pulling lever to the pivot member with a connector pivot, and pivotally connecting a pulling connector and the pulling lever with a lever pivot;
    securing a flexible member to one end of the pulling connector of the leveraged pulling device, the flexible member having one or more stop engagement members along its length;
    pivotally connecting the pivot member of the leveraged pulling device to mount at pivot mount, such that the leveraged pulling device may be selectively rotated between a cap tightening position and a cap loosening position;
    positioning the lever pivot adjacent a pulling device plane parallel to a central axis of the hub and extending between an axis of the connector pivot and an axis of the pivot mount, such that the pulling lever may be moved into a locking position;
    engaging one of the one or more stop engagement members with one of the pulling stops on the cap; and
    thereafter pulling the pulling lever to selectively thread or unthread the cap from the hub.

15. The method as defined in claim 14, further comprising:
    providing one or more slots on the cap each extending to a periphery of the cap for serving as the one or more pulling stops.

16. The method as defined in claim 15, further comprising:
    providing a slot portion in each slot which is substantially tangential to the periphery of the cap.

* * * * *